(12) United States Patent
Yoshida

(10) Patent No.: US 9,987,988 B2
(45) Date of Patent: Jun. 5, 2018

(54) VEHICLE MIRROR DEVICE

(71) Applicant: KABUSHIKI KAISHA TOKAI-RIKA-DENKI-SEISAKUSHO, Aichi (JP)

(72) Inventor: Shigeki Yoshida, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days. days.

(21) Appl. No.: 15/309,627

(22) PCT Filed: Apr. 22, 2015

(86) PCT No.: PCT/JP2015/062302
§ 371 (c)(1),
(2) Date: Nov. 8, 2016

(87) PCT Pub. No.: WO2015/194258
PCT Pub. Date: Dec. 23, 2015

(65) Prior Publication Data
US 2017/0158137 A1 Jun. 8, 2017

(30) Foreign Application Priority Data
Jun. 17, 2014 (JP) .................................. 2014-124523

(51) Int. Cl.
*B60R 1/072* (2006.01)
(52) U.S. Cl.
CPC ..................................... *B60R 1/072* (2013.01)
(58) Field of Classification Search
CPC .................................. B60R 1/072; G02B 7/198
(Continued)

(56) References Cited

U.S. PATENT DOCUMENTS 8,801,203 B2 * 8/2014 Schadler ................. B60R 1/072
359/872
8,845,113 B2 * 9/2014 Schadler ................. B60R 1/066
359/872
(Continued)

FOREIGN PATENT DOCUMENTS

| JP | H04-31636 | 3/1992 |
| JP | H08-310301 | 11/1996 |
| JP | 2011-162011 | 8/2011 |

OTHER PUBLICATIONS

International Search Report issued in a corresponding application PCT/JP2015/062302 dated Jul. 21, 2015.

*Primary Examiner* — Frank Font
(74) *Attorney, Agent, or Firm* — Thomas W. Cole; Roberts Mlotkowski Safran Cole & Calderon, P.C.

(57) ABSTRACT

At a vehicle door mirror device, an inner wall of a mirror holder is nipped between a supporting surface of an inner case and a contacting surface of a support pivot, and a peripheral wall of the mirror holder is made to press-contact a peripheral wall of a case. Here, at a time when the mirror holder is rotated, the support pivot is displaced toward a vehicle rear side, and nipping of the inner wall between the supporting surface and the contacting surface is cancelled, and press-contacting of the mirror holder peripheral wall against the case peripheral wall is cancelled. Therefore, frictional force between the supporting surface and the contacting surface and the inner wall, and frictional force between the case peripheral wall and the mirror holder peripheral wall, can be reduced effectively.

7 Claims, 8 Drawing Sheets

(58) Field of Classification Search
USPC .................................................. 359/872, 877
See application file for complete search history.

(56) References Cited

U.S. PATENT DOCUMENTS

| | | | |
|---|---|---|---|
| 9,022,588 B2* | 5/2015 | Chino | ..................... B60R 1/072 |
| | | | 359/871 |
| 2009/0190243 A1* | 7/2009 | Fukai | ..................... B60R 1/072 |
| | | | 359/877 |
| 2011/0194202 A1 | 8/2011 | Kudo et al. | |
| 2011/0194203 A1* | 8/2011 | Foote | ..................... B60R 1/062 |
| | | | 359/876 |
| 2012/0008223 A1* | 1/2012 | Schadler | ................ B60R 1/072 |
| | | | 359/872 |
| 2012/0099213 A1* | 4/2012 | Schadler | ................ B60R 1/066 |
| | | | 359/877 |
| 2012/0218657 A1* | 8/2012 | Chino | ..................... B60R 1/072 |
| | | | 359/876 |

* cited by examiner

VEHICLE MIRROR DEVICE

CROSS-REFERENCE TO RELATED APPLICATIONS

The present application is a U.S. National Phase of PCT/JP2015/062302 filed on Apr. 22, 2015 claiming priority to Japanese Patent application No. 2014-124523 filed Jun. 17, 2014. The disclosure of the PCT Application is hereby incorporated by reference into the present Application.

TECHNICAL FIELD

The present invention relates to a vehicle mirror device at which the mirror surface angle of a mirror of a vehicle is adjusted.

BACKGROUND ART

In the back mirror disclosed in Japanese Patent Application Laid-Open (JP-A) No. 8-310301, due to a tensile spring being contracted, a pivot plate is tilted, and the angle of a mirror surface is adjusted. Further, a tilting pivot of the pivot plate is nipped between a supporting pivot of a mirror base and a cap support, due to the urging force of a fixed spring.

Here, at this back mirror, when the pivot plate is tilted, due to the cap support being pushed by a shock-absorbing spring, the nipping force of the tilting pivot by the supporting pivot and the cap support is lessened, and the frictional force between the supporting pivot and the cap support and the tilting pivot is decreased.

SUMMARY OF INVENTION

Technical Problem

In view of the above-described circumstances, an object of the present invention is to provide a vehicle mirror device that can effectively reduce the frictional force between a moving member and a contacting member at the time when the moving member is moved.

Solution to Problem

A vehicle mirror device of a first aspect of the present invention comprises: a mirror that is provided at a vehicle; a moving member that, due to the moving member being moved, a mirror surface angle of the mirror is adjusted; a contacting member that is made to contact the moving member; and displacing means for, at a time when the moving member is moved, displacing one of the moving member and the contacting member in a direction of moving away from another of the moving member and the contacting member.

A vehicle mirror device of a second aspect of the present invention comprises, in the vehicle mirror device of the first aspect of the present invention, contacting means for applying contact force to one of the moving member and the contacting member, and the moving member and the contacting member contact one another, and, at a time when the moving member is moved, the displacing means displaces one of the moving member and the contacting member against the contact force.

A vehicle mirror device of a third aspect of the present invention comprises, in the vehicle mirror device of the first aspect or the second aspect of the present invention, driving means to which the displacing means is electrically connected in a parallel state, and, due to the driving means being driven, the moving member is moved.

Advantageous Effects of Invention

In the vehicle mirror device of the first aspect of the present invention, the mirror surface angle of the mirror is adjusted due to the moving member being moved. Further, the moving member and the contacting member are made to contact one another.

Here, at the time when the moving member is moved, the displacing means displaces one of the moving member and the contacting member in direction of moving away from the other of the moving member and the contacting member. Therefore, frictional force between the moving member and the contacting member can be reduced effectively.

In the vehicle mirror device of the second aspect of the present invention, the contacting means applies contact force to one of the moving member and the contacting member, and the moving member and the contacting member are made to contact one another.

Here, at the time when the moving member is moved, the displacing means displaces one of the moving member and the contacting member against the contact force of the contacting means. Therefore, the moving member and the contacting member being made to contact one another by the contact force of the contacting means can be suppressed, and frictional force between the moving member and the contacting member can be reduced more effectively.

In the vehicle mirror device of the third aspect of the present invention, the moving member is moved due to the driving means being driven.

Here, the displacing means is electrically connected to the driving means in a parallel state. Therefore, the force of displacing one of the moving member and the contacting member by the displacing means can be made to be large.

DESCRIPTION OF EMBODIMENTS

First Embodiment

Figure 1:
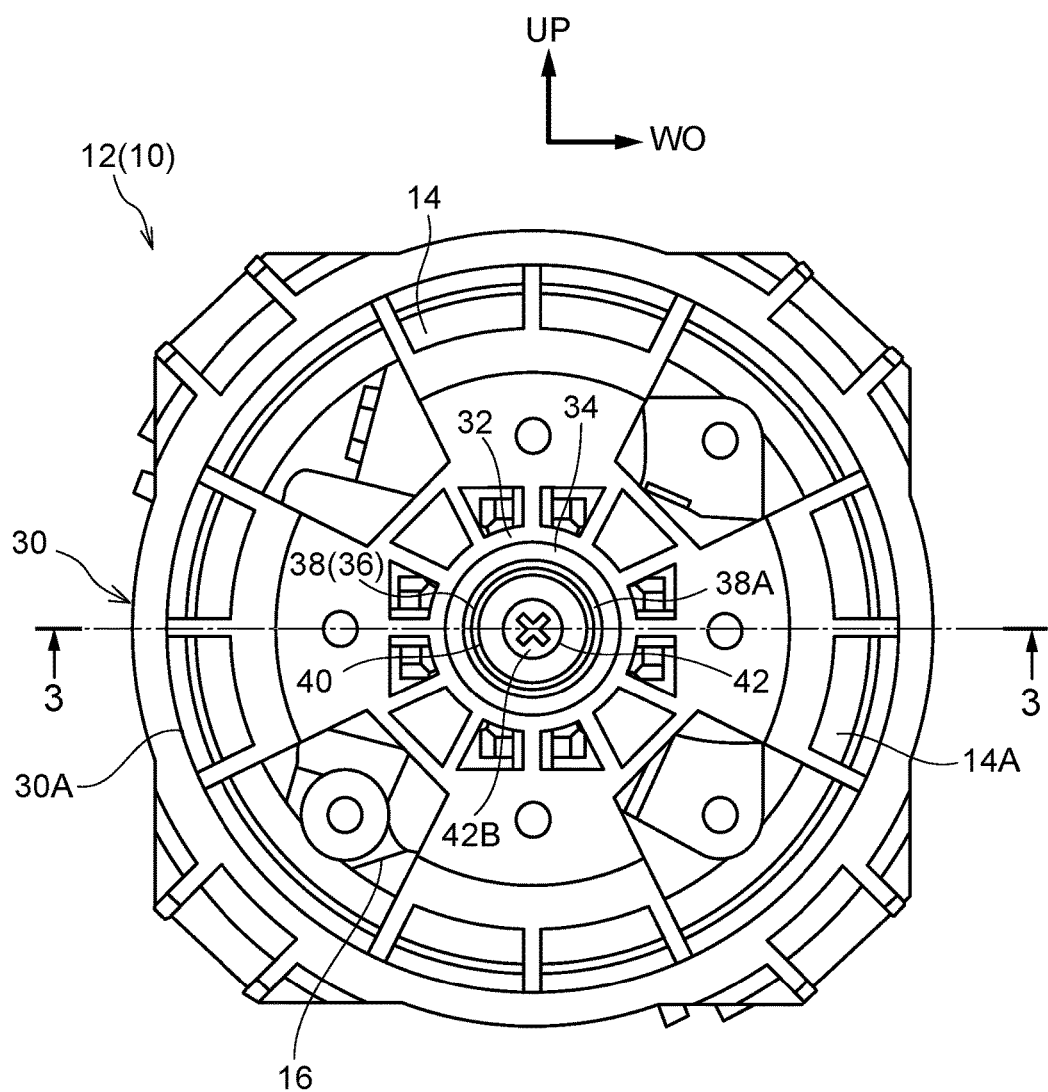
FIG. 1 is an elevational view that is seen from a vehicle rear side and shows a mirror surface adjusting device of a vehicle door mirror device relating to a first embodiment of the present invention.
Figure 2:
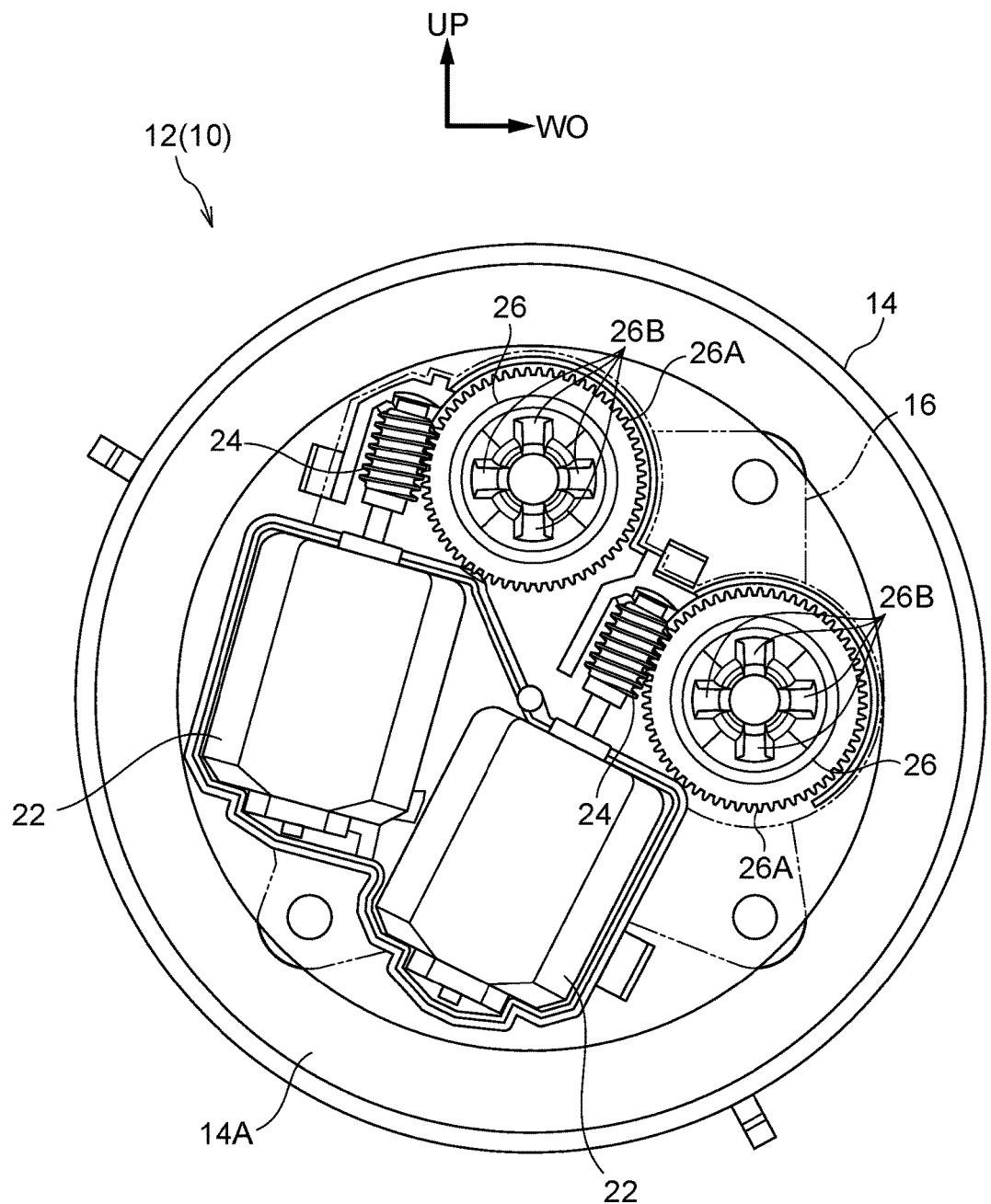
FIG. 2 is an elevational view that is seen from the vehicle rear side and shows a case and the like of the mirror surface adjusting device of the vehicle door mirror device relating to the first embodiment of the present invention.
Figure 3:
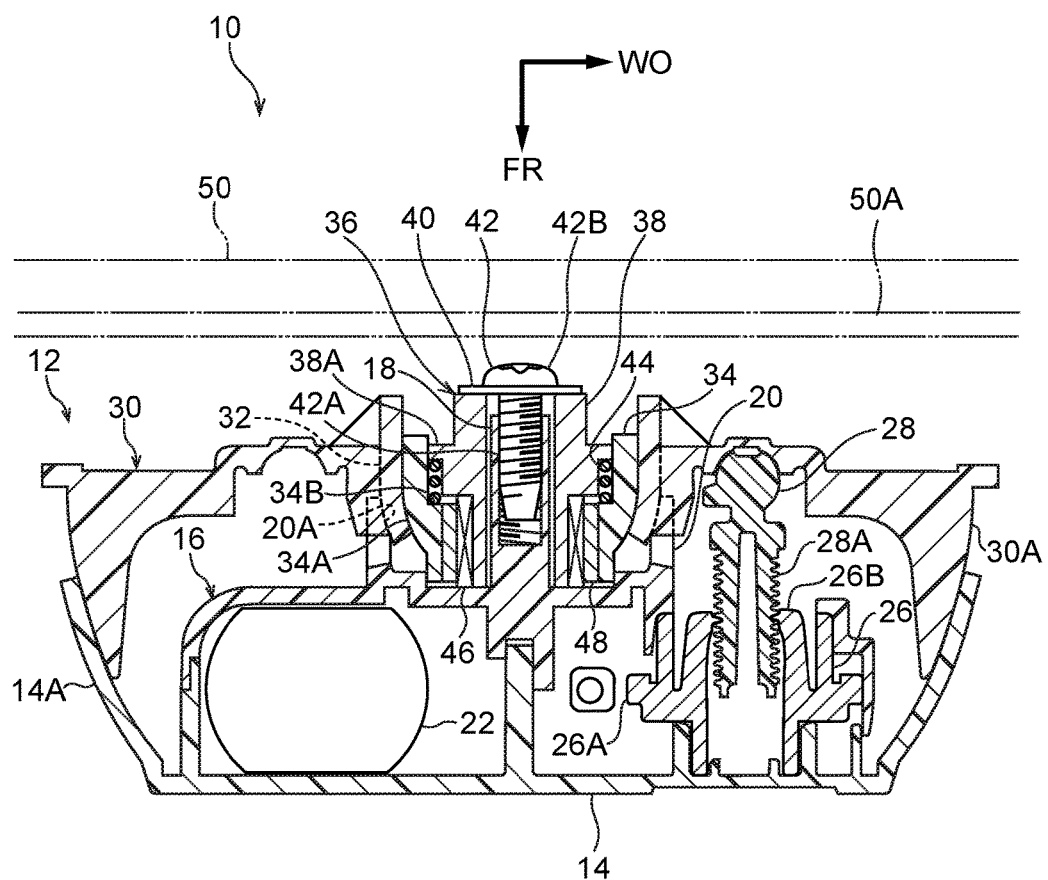
FIG. 3 is a cross-sectional view (a cross-sectional view along line 3-3 of FIG. 1) that is seen from the lower side and shows the mirror surface adjusting device of the vehicle door mirror device relating to the first embodiment of the present invention.

Main portions of a vehicle door mirror device 10, that relates to a first embodiment and to which the vehicle door mirror device of the present invention is applied, are shown in FIG. 1 in an elevational view seen from the vehicle rear side. Some of the main portions of the vehicle door mirror device 10 are shown in FIG. 2 in an elevational view seen from the vehicle rear side. Moreover, main portions of the vehicle door mirror device 10 are shown in FIG. 3 in a cross-sectional view seen from the lower side (a cross-sectional view along line 3-3 of FIG. 1). Note that, in the drawings, the vehicle forward direction is indicated by arrow FR, the vehicle transverse direction outer side is indicated by arrow WO, and the upward direction is indicated by arrow UP.

The vehicle door mirror device 10 relating to the present embodiment is disposed at a door (a side door) of a vehicle. A mirror surface adjusting device 12 is provided at the interior of the vehicle door mirror device 10.

As shown in FIG. 1 through FIG. 3, the mirror surface adjusting device 12 has a case 14 that is made of resin, and is shaped as a substantially hemispherical container, and serves as an outer contacting member that forms a contacting body. The case 14 is fixed to the interior of the vehicle door mirror device 10. The vehicle rear side surface of the case 14 opens in a circular shape. The bottom surface (the vehicle front side end wall) of the case 14 is shaped as a circular flat plate, and a peripheral wall 14A (outer contacting portion) of the case 14 is curved in the shape of a spherical wall. Further, the vehicle rear side surface (the opening), the bottom wall and the peripheral wall 14A of the case 14 are disposed coaxially with the central axis of the case 14.

An inner case 16, that is made of resin and is shaped as a container and serves as an inner contacting member that structures the contacting body, is fixed to the bottom wall of the case 14 interior. The vehicle front side surface of the inner case 16 is open. A fixed pillar 18 (see FIG. 4) that is substantially solid cylindrical is provided integrally with the bottom wall (the vehicle rear side end wall) of the inner case 16. The fixed pillar 18 projects-out toward the vehicle rear side and is disposed coaxially with the central axis of the case 14.

A supporting wall 20 (see FIG. 4) that is substantially cylindrical tube shaped is provided integrally with the bottom wall of the inner case 16 at the outer peripheral side of the fixed pillar 18. The supporting wall 20 projects-out toward the vehicle rear side and is disposed coaxially with the central axis of the case 14. The inner peripheral surface of the vehicle rear side portion of the supporting wall 20 is a supporting surface 20A (inner contacting portion) that is shaped as a spherical surface, and the supporting surface 20A is disposed coaxially with the central axis of the case 14.

A pair of motors 22 serving as driving means are provided within the case 14. The motors 22 are fixed between the bottom wall of the case 14 and the bottom wall of the inner case 16. Further, worms 24 are fixed to the output shafts of the motors 22.

A pair of wheel drives 26, that are substantially solid cylindrical and serve as engaging members, are provided within the case 14. The wheel drives 26 are supported, so as to be able to rotate freely around the axes thereof, between the bottom wall of the case 14 and the bottom wall of the inner case 16. Further, the wheel drive 26 interiors open toward the vehicle rear side of the inner case 16 via the bottom wall of the inner case 16.

A worm wheel 26A is formed at the wheel drive 26. The worm wheel 26A is meshed (engaged) with the worm 24 of the motor 22. Therefore, due to the motor 22 being driven and the worm 24 being rotated, the worm wheel 26A is rotated, and the wheel drive 26 is rotated.

A predetermined number (four in the present embodiment) of meshing claws 26B that serve as engaging portions are provided integrally with the wheel drive 26. The predetermined number of meshing claws 26B are disposed at a uniform interval in the peripheral direction of the wheel drive 26. The meshing claws 26B extend-out from the wheel drive 26 toward the vehicle rear side, and are elastic. The distal ends (the vehicle rear side ends) of the meshing claws 26B project-out toward the radial direction inner side of the wheel drive 26.

A rod drive 28, that is substantially solid cylindrical and serves as a driving member, is coaxially inserted in the wheel drive 26. The rod drive 28 projects-out toward the vehicle rear side from the inner case 16, and rotation thereof around the axis thereof is regulated. One of the rod drives 28 is disposed above (or may be disposed below) the central axis of the case 14, and the other rod drive 28 is disposed at the vehicle transverse direction outer side (or may be disposed at the vehicle transverse direction inner side) of the central axis of the case 14.

The portion of the rod drive 28 other than the distal end portion (the vehicle rear side end portion) thereof is a screw 28A, and the meshing claw 26B distal ends of the wheel drive 26 are meshed (engaged) with the screw 28A. Therefore, due to the wheel drive 26 (including the meshing claws 26B) being rotated as described above, the meshed positions of the meshing claw 26B distal ends with the screw 28A are changed, and the rod drive 28 is moved in the vehicle longitudinal direction (the axial direction).

A mirror holder 30, that is substantially shaped as a cylindrical tube having a bottom and that is made of resin and that serves as a moving member, is provided at the vehicle rear side of the case 14. The mirror holder 30 is disposed coaxially with the central axis of the case 14. The vehicle front side surface of the mirror holder 30 is open in a circular shape, and the bottom wall (the vehicle rear side end wall) of the mirror holder 30 is formed substantially in the shape of a circular flat plate, and a peripheral wall 30A (outer moving portion) of the mirror holder 30 is curved in the shape of a spherical wall. The peripheral wall 30A of the mirror holder 30 is disposed at the inner side of the peripheral wall 14A of the case 14, and the outer peripheral surface of the peripheral wall 30A of the mirror holder 30 contacts (planarly contacts) the inner peripheral surface of the peripheral wall 14A of the case 14.

Figure 4:
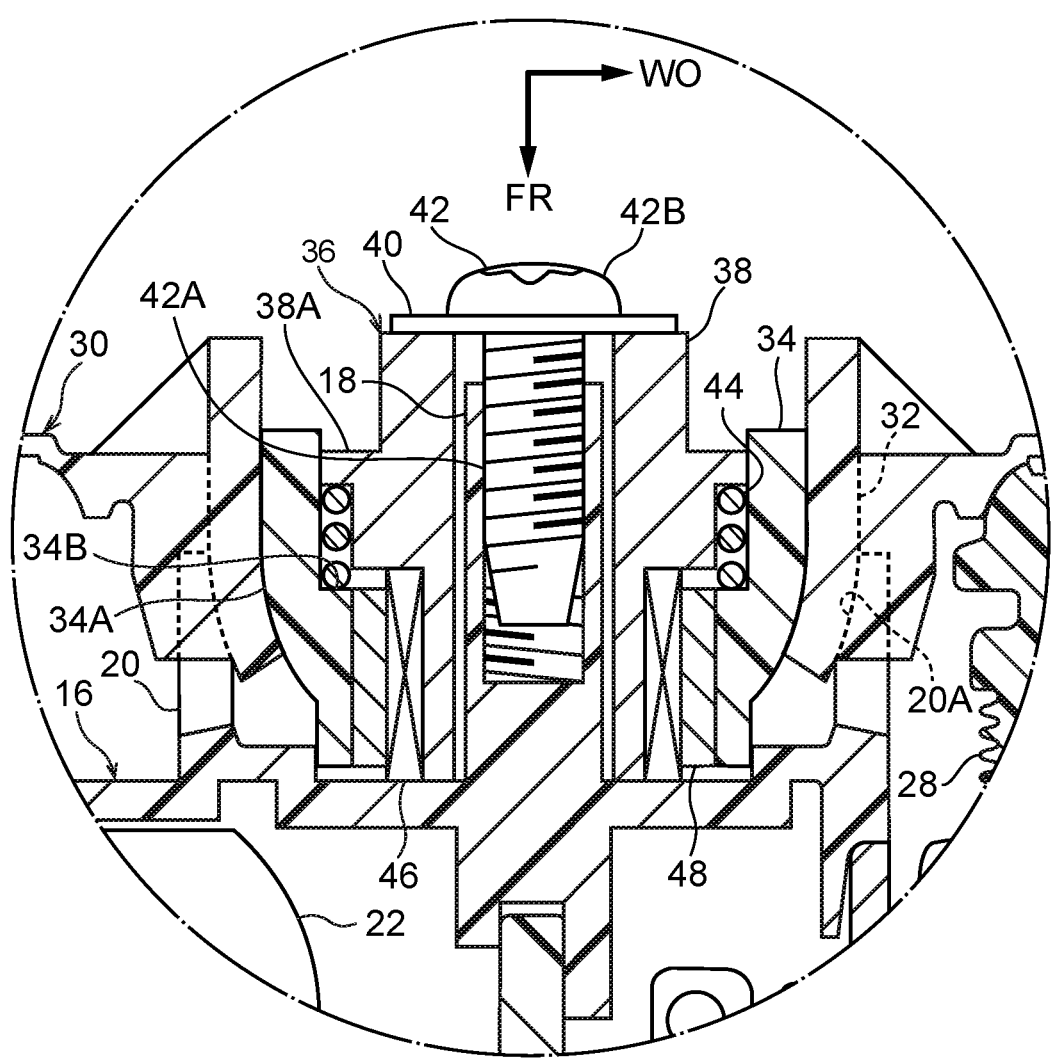
FIG. 4 is a cross-sectional view (a cross-sectional view along line 3-3 of FIG. 1) that is seen from the lower side and shows main portions of the mirror surface adjusting device of the vehicle door mirror device relating to the first embodiment of the present invention.

As shown in detail in FIG. 4, an inner wall 32 (inner moving portion) that is substantially cylindrical tube shaped is provided integrally with the central portion of the bottom wall of the mirror holder 30, and the inner wall 32 interior is open toward the vehicle front side and the vehicle rear side. The inner wall 32 is disposed coaxially with the central axis of the case 14, and the inner wall 32 is disposed at the inner side of the supporting wall 20 of the inner case 16. The vehicle front side portion of the inner wall 32 is curved in the shape of a spherical wall, and the outer peripheral surface of the vehicle front side portion of the inner wall 32 contacts (planarly contacts) the supporting surface 20A of the supporting wall 20.

A support pivot 34, that is substantially cylindrical tube shaped and is made of resin and serves as a middle contacting member (contacting member), is provided at the inner wall 32 interior, and the support pivot 34 is disposed coaxially with the central axis of the case 14. The outer peripheral surface, other than at the vehicle front side end, of the support pivot 34 is a contacting surface 34A. The vehicle front side portion of the contacting surface 34A is curved in the shape of a spherical surface, and contacts (planarly contacts) the inner peripheral surface of the inner wall 32.

A step surface 34B, that is shaped as an annular flat surface, is formed coaxially with the vehicle longitudinal direction (the axial direction) intermediate portion of the inner peripheral surface of the support pivot 34, and the step surface 34B is disposed perpendicular to the vehicle longitudinal direction. The inner diameter of the support pivot 34 is changed by the step surface 34B, and the inner diameter of the support pivot 34 at the vehicle front side portion thereof (further toward the vehicle front side than the step surface 34B) is small as compared with at the vehicle rear side portion thereof (further toward the vehicle rear side than the step surface 34B).

A solenoid 36 serving as a displacing means is provided at the support pivot 34 interior.

A fixed iron core 38, that is substantially cylindrical tube shaped and is made of metal and serves as a fixed member, is provided at the solenoid 36. The fixed iron core 38 is disposed coaxially with the central axis of the case 14, and the fixed pillar 18 of the inner case 16 is inserted coaxially in the interior of the fixed iron core 38. A flange 38A, that is shaped as an annular flat plate, is provided coaxially at the vehicle longitudinal direction (the axial direction) intermediate portion of the fixed iron core 38. The flange 38A projects-out toward the outer peripheral outer side of the fixed iron core 38, and is fit-together with the vehicle rear side portion of the support pivot 34 interior.

A washer 40, that is shaped as an annular flat plate and that structures a mounting means, is disposed coaxially at the vehicle rear side of the fixed iron core 38. A screw 42 that structures the mounting means is coaxially passed-through the washer 40 interior and the fixed iron core 38 interior, and a screw portion 42A of the screw 42 is screwed-together coaxially with the fixed pillar 18 of the inner case 16, and the washer 40 is nipped between a head portion 42B of the screw 42 and the fixed iron core 38. Due thereto, the fixed iron core 38 is fixed to the inner case 16, and the solenoid 36 is mounted to the inner case 16.

A coil spring 44 serving as an urging means (contacting means) is bridged between the step surface 34B of the support pivot 34 and the flange 38A of the fixed iron core 38. The coil spring 44 is compressed, and urges the support pivot 34 toward the vehicle front side. Therefore, due to the urging force (contact force) of the coil spring 44, the inner wall 32 of the mirror holder 30 is nipped between the supporting surface 20A of the supporting wall 20 of the inner case 16 and the contacting surface 34A of the support pivot 34, and the outer peripheral surface of the peripheral wall 30A of the mirror holder 30 is made to press-contact the inner peripheral surface of the peripheral wall 14A of the case 14, and, due thereto, the mirror holder 30 is mounted to the case 14 and the inner case 16.

The outer diameter dimension of the front side portion of the fixed iron core 38 is small as compared with that of the other portions, and a coil 46 is provided coaxially at the outer periphery of the vehicle front side portion of the fixed iron core 38. A movable iron core 48, that is cylindrical tube shaped and is made of metal and serves as a displacement member, is provided coaxially at the outer periphery of the coil 46. The outer peripheral surface of the movable iron core 48 is fixed to the vehicle front side portion of the inner peripheral surface of the support pivot 34.

Figure 5:
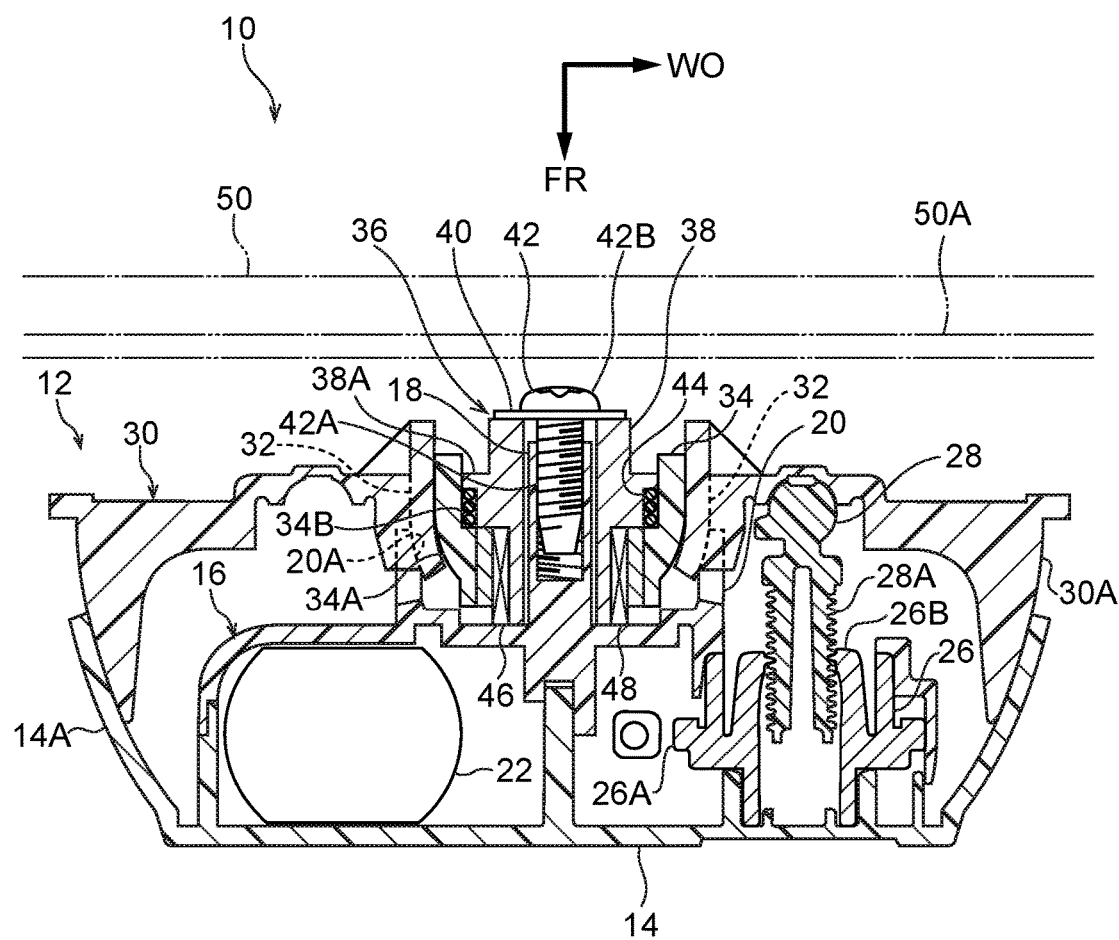
FIG. 5 is a cross-sectional view that is seen from the lower side and shows a time of operation of the mirror surface adjusting device of the vehicle door mirror device relating to the first embodiment of the present invention.
Figure 6:
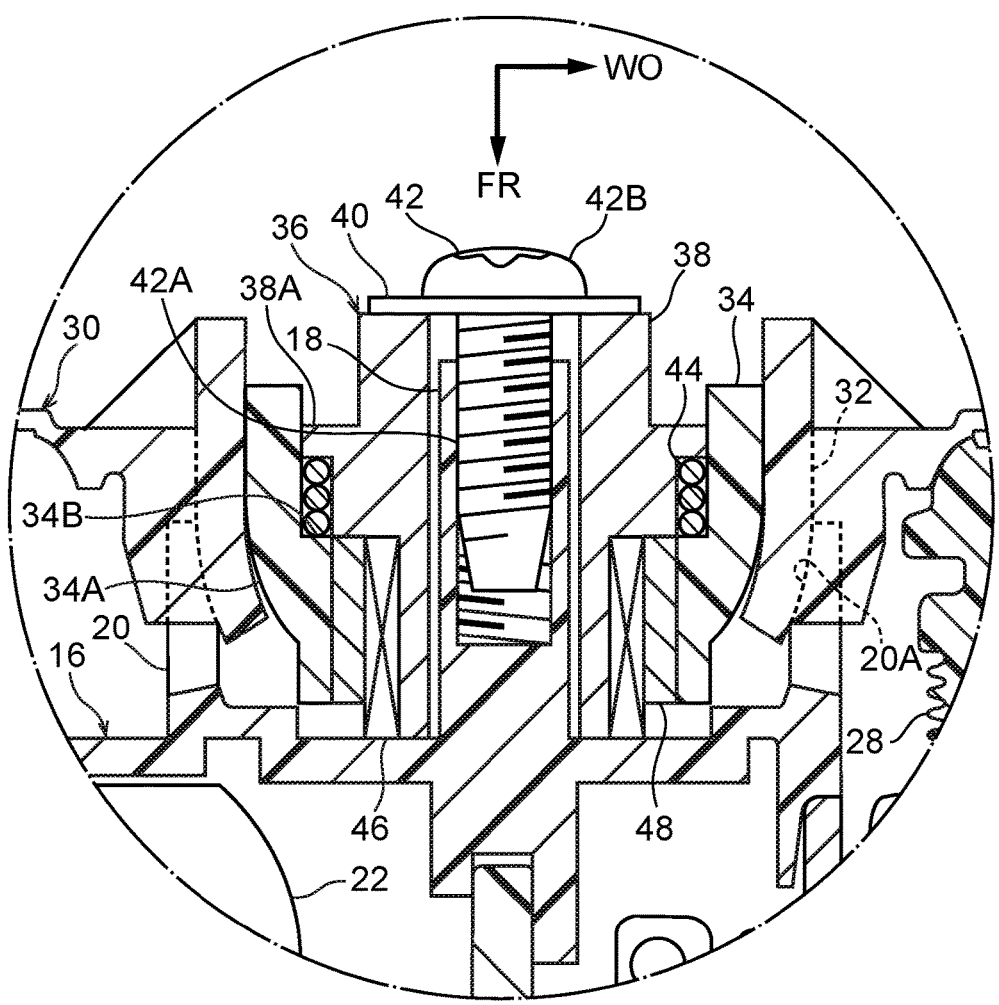
FIG. 6 is a cross-sectional view that is seen from the lower side and shows main portions at a time of operation of the mirror surface adjusting device of the vehicle door mirror device relating to the first embodiment of the present invention.

The solenoid 36 (the coil 46) is electrically connected in a parallel state to the respective motors 22. At the time when at least one of the pair of motors 22 is driven, the solenoid 36 is operated simultaneously. Due thereto, as shown in FIG. 5 and FIG. 6, at the time when the solenoid 36 is operated, the movable iron core 48 is displaced by a predetermined distance (e.g., greater than or equal to 0.1 mm and less than or equal to 0.5 mm) toward the vehicle rear side by the magnetic force of the coil 46, and the support pivot 34 is displaced integrally with the movable iron core 48 and against the urging force of the coil spring 44, toward the vehicle rear side (the direction in which the contacting surface 34A of the support pivot 34 moves away from the inner wall 32 of the mirror holder 30). Due thereto, the nipping of the inner wall 32 of the mirror holder 30 between the supporting surface 20A of the inner case 16 (the supporting wall 20) and the contacting surface 34A of the support pivot 34 is cancelled, and the press-contacting of the outer peripheral surface of the peripheral wall 30A of the mirror holder 30 against the inner peripheral surface of the peripheral wall 14A of the case 14 is cancelled.

As shown in FIG. 3, the bottom wall (the vehicle rear side end wall) of the mirror holder 30 holds the distal end portions (the vehicle rear side end portions) of the rod drives 28 so as to be rotatable. As described above, due to the motor 22 being driven and the rod drive 28 being moved in the vehicle longitudinal direction, the mirror holder 30 is rotated.

A mirror 50 is detachably mounted to the bottom wall of the mirror holder 30 at the vehicle rear side, and the mirror 50 is made able to rotate integrally with the mirror holder 30. A mirror surface 50A (the surface of the layer opposite the reverse side) of the mirror 50 faces the vehicle rear side, and an occupant of the vehicle can view the vehicle rear side due to the mirror 50.

Operation of the present embodiment is described next.

In the vehicle door mirror device 10 of the above-described structure, at the mirror surface adjusting device 12, due to the urging force of the coil spring 44, the inner wall 32 of the mirror holder 30 is nipped between the supporting surface 20A of the supporting wall 20 of the inner case 16 and the contacting surface 34A of the support pivot 34, and the outer peripheral surface of the peripheral wall 30A of the mirror holder 30 is made to press-contact the inner peripheral surface of the peripheral wall 14A of the case 14.

Further, due to the motor 22 being driven and the worm 24 being rotated, the wheel drive 26 (including the worm wheel 26A and the predetermined number of meshing claws 26B) is rotated, and the rod drive 28 is moved in the vehicle longitudinal direction. Therefore, the mirror holder 30 and the mirror 50 are rotated in at least one of the vertical direction and the vehicle transverse direction by the rod drive 28, and due thereto, the mirror surface 50A angle of the mirror 50 is adjusted in at least one of the vertical direction and the vehicle transverse direction.

Here, at the time when the motor 22 is driven and the mirror holder 30 is rotated, due to the solenoid 36 being operated, the movable iron core 48 and the support pivot 34 are displaced toward the vehicle rear side, and the nipping of the inner wall 32 of the mirror holder 30 between the supporting surface 20A of the inner case 16 and the contacting surface 34A of the support pivot 34 is cancelled, and the press-contacting of the peripheral wall 30A outer peripheral surface of the mirror holder 30 against the peripheral wall 14A inner peripheral surface of the case 14 is cancelled. Therefore, the frictional force (sliding resistance) between the supporting surface 20A and the contacting surface 34A and the inner wall 32, and the frictional force (sliding resistance) between the peripheral wall 14A inner peripheral surface of the case 14 and the peripheral wall 30A outer peripheral surface of the mirror holder 30, can be reduced effectively.

Due thereto, the ability to rotate the mirror holder 30 by the driving of the motors 22 can be improved effectively, and the ability to adjust the mirror surface 50A angle of the mirror 50 can be improved effectively. Moreover, it is possible to eliminate the need to provide a lubricant (grease) between the supporting surface 20A and the contacting surface 34A and the inner wall 32, and between the peripheral wall 14A inner peripheral surface of the case 14 and the peripheral wall 30A outer peripheral surface of the mirror holder 30.

Moreover, at the time when the motor 22 is driven and the mirror holder 30 is rotated, due to the solenoid 36 being operated, the movable iron core 48 and the support pivot 34 are displaced toward the vehicle rear side against the urging force of the coil spring 44. Therefore, the inner wall 32 being made to contact the supporting surface 20A and the contacting surface 34A due to the urging force of the coil spring 44 can be suppressed, and the peripheral wall 30A outer peripheral surface of the mirror holder 30 being made to contact the peripheral wall 14A inner peripheral surface of the case 14 due to the urging force of the coil spring 44 can be suppressed, and the frictional force between the supporting surface 20A and the contacting surface 34A and the inner wall 32, and the frictional force between the peripheral wall 14A inner peripheral surface of the case 14 and the peripheral wall 30A outer peripheral surface of the mirror holder 30 can be reduced more effectively.

Moreover, the solenoid 36 is electrically connected in a parallel state to the respective motors 22. Therefore, by a simple structure, the solenoid 36 can be operated simultaneously at the time when at least one of the pair of motors 22 is driven. Moreover, at the time when the solenoid 36 is operated, the electric power that is supplied to the solenoid 36 can be made to be large, and the force of displacing the movable iron core 48 and the support pivot 34 toward the vehicle rear side by the operation of the solenoid 36 can be made to be large, and the frictional force between the supporting surface 20A and the contacting surface 34A and the inner wall 32, and the frictional force between the peripheral wall 14A inner peripheral surface of the case 14 and the peripheral wall 30A outer peripheral surface of the mirror holder 30, can be reduced more effectively.

Further, even if the urging force of the coil spring 44 is made to be large, at the time when the mirror surface 50A angle of the mirror 50 is adjusted, as described above, the ability to rotate the mirror holder 30 by the driving of the motor 22 can be improved effectively. Therefore, the urging force of the coil spring 44 can be made to be large, and, at a time when the mirror surface 50A angle of the mirror 50 is not being adjusted, the nipping force of the inner wall 32 of the mirror holder 30 between the supporting surface 20A of the inner case 16 and the contacting surface 34A of the support pivot 34 can be made to be large, and the press-contacting force of the peripheral wall 30A outer peripheral surface of the mirror holder 30 against the peripheral wall 14A inner peripheral surface of the case 14 can be made to be large, and the supporting rigidity of the mirror holder 30 by the case 14 and the inner case 16 can be improved. Due thereto, at the time when the vehicle travels or the like, vibration of the mirror holder 30 with respect to the case 14 and the inner case 16 can be suppressed, and chattering of the mirror 50 can be suppressed, and the visibility using the mirror 50 can be improved. Moreover, it is possible to eliminate the need to separately provide, at the vehicle door mirror device 10, a structure that suppresses chattering of the mirror 50 (for example, a structure that causes the mirror 50 and portions, other than the mirror 50 and the mirror holder 30, of the vehicle door mirror device 10 to contact one another elastically).

Second Embodiment

Figure 7:
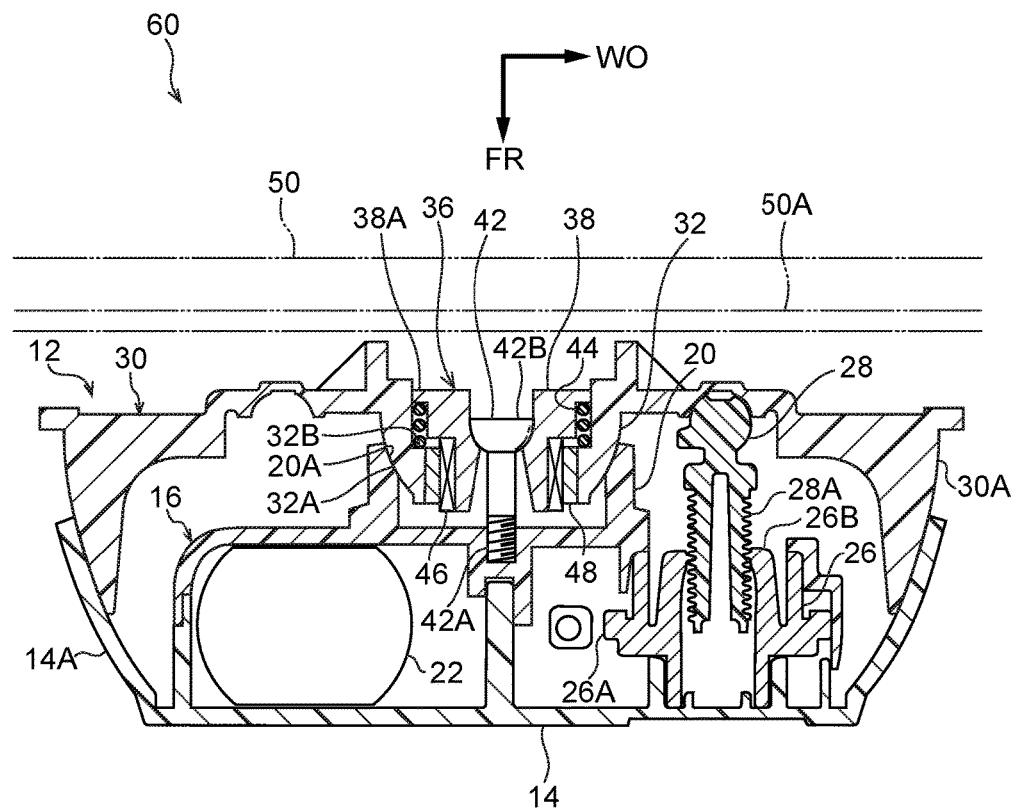
FIG. 7 is a cross-sectional view (a cross-sectional view at the position of line 3-3 of FIG. 1) that is seen from the lower side and shows a mirror surface adjusting device of a vehicle door mirror device relating to a second embodiment of the present invention.

Main portions of a vehicle door mirror device 60, that relates to a second embodiment and to which the vehicle door mirror device of the present invention is applied, are shown in FIG. 7 in a cross-sectional view seen from the lower side (a cross-sectional view at the position of line 3-3 of FIG. 1).

The vehicle door mirror device 60 relating to the present embodiment has substantially the same structure as the above-described first embodiment, but differs with regard to the following points.

As shown in FIG. 7, in the vehicle door mirror device 60 relating to the present embodiment, at the mirror surface adjusting device 12, the fixed pillar 18 of the above-described first embodiment is not provided at the inner case 16, and the support pivot 34 of the above-described first embodiment is not provided. Further, the case 14 and the inner case 16 structure the contacting member.

In the mirror surface adjusting device 12, the outer peripheral surface of the portion, that is other than the vehicle front side end of the inner wall 32, at the mirror holder 30 is a contacting surface 32A. The contacting surface 32A is curved in the form of a spherical surface, and is made to contact (planarly contact) the supporting surface 20A of the supporting wall 20 of the inner case 16. A step surface 32B that is shaped as an annular flat surface is formed coaxially at the vehicle longitudinal direction (the axial direction) intermediate portion of the inner peripheral surface of the inner wall 32, and the step surface 32B is disposed perpendicular to the vehicle longitudinal direction. The inner diameter of the inner wall 32 is changed by the step surface 32B, and the inner diameter of the inner wall 32 at the vehicle front side portion thereof (further toward the vehicle front side than the step surface 32B) is small as compared with at the vehicle rear side portion thereof (further toward the vehicle rear side than the step surface 32B).

At the solenoid 36, the flange 38A is provided at the vehicle rear side end of the fixed iron core 38, and the flange 38A is fit-together with the vehicle rear side portion of inner wall 32 interior. Further, the vehicle rear side portion of the fixed iron core 38 interior is shaped as a cylindrical pillar. The vehicle longitudinal direction intermediate portion of the fixed iron core 38 interior is hemispherical, and the diameter dimension of the vehicle longitudinal direction intermediate portion of the fixed iron core 38 interior gradually becomes smaller toward the vehicle front side. The vehicle front side portion of the fixed iron core 38 interior is shaped as a truncated cone, and the diameter dimension of the vehicle front side portion of the fixed iron core 38 interior becomes gradually larger toward the vehicle front side.

The screw 42 that serves as the mounting means is inserted coaxially in the fixed iron core 38 interior, and the screw portion 42A of the screw 42 is screwed-together with the bottom wall (the vehicle rear side end wall) of the inner case 16. The head portion 42B of the screw 42 is hemispherical, and the diameter dimension thereof becomes gradually smaller toward the vehicle front side, and the head portion 42B is fit-together with the vehicle longitudinal direction intermediate portion of the fixed iron core 38 interior. Due thereto, the fixed iron core 38 is mounted to the inner case 16, and the solenoid 36 is mounted to the inner case 16.

The coil spring 44 is bridged between the step surface 32B of the inner wall 32 of the mirror holder 30 and the flange 38A of the fixed iron core 38. The coil spring 44 is compressed, and urges the mirror holder 30 toward the vehicle front side. Therefore, due to the urging force (contact force) of the coil spring 44, the contacting surface 32A of the inner wall 32 of the mirror holder 30 is made to press-contact the supporting surface 20A of the supporting wall 20 of the inner case 16, and the outer peripheral surface of the peripheral wall 30A of the mirror holder 30 is made to press-contact the inner peripheral surface of the peripheral wall 14A of the case 14, and, due thereto, the mirror holder 30 is mounted to the case 14 and the inner case 16.

Figure 8:
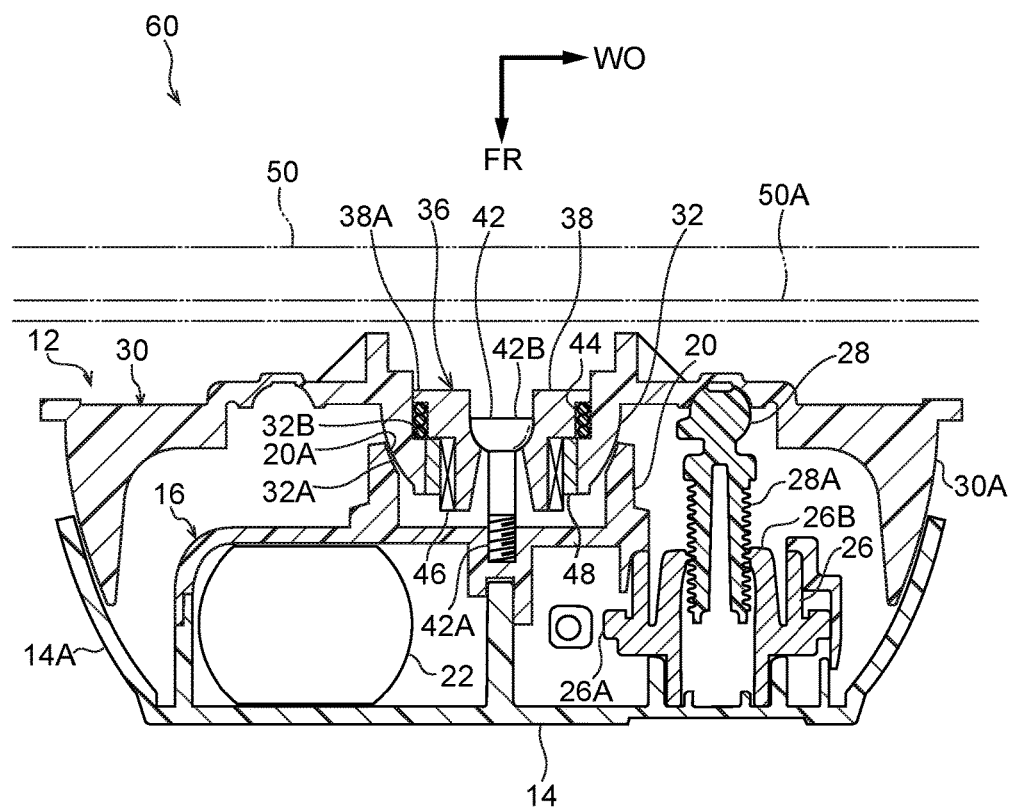
FIG. 8 is a cross-sectional view that is seen from the lower side and shows a time of operation of the mirror surface adjusting device of the vehicle door mirror device relating to the second embodiment of the present invention.

The outer peripheral surface of the movable iron core 48 is fixed to the vehicle front side portion of the inner wall 32 inner peripheral surface of the mirror holder 30. Due thereto, as shown in FIG. 8, at the time when the solenoid 36 is operated, the movable iron core 48 is displaced a predetermined distance (e.g., greater than or equal to 0.1 mm and less than or equal to 0.5 mm) toward the vehicle rear side by the magnetic force of the coil 46, and the mirror holder 30 is displaced integrally with the movable iron core 48 and against the urging force of the coil spring 44, toward the vehicle rear side (the direction in which the inner wall 32 and the peripheral wall 30A of the mirror holder 30 move away from the supporting surface 20A of the inner case 16 (the supporting wall 20) and the peripheral wall 14A of the case 14, respectively). Due thereto, the press-contacting of the inner wall 32 of the mirror holder 30 against the supporting surface 20A of the inner case 16 is cancelled, and the press-contacting of the peripheral wall 30A outer peripheral surface of the mirror holder 30 against the peripheral wall 14A inner peripheral surface of the case 14 is cancelled.

Here, the present embodiment as well can achieve operation and effects that are similar to those of the above-described first embodiment.

Moreover, at the time when the motor 22 is driven and the mirror holder 30 is rotated, due to the solenoid 36 being operated, the movable iron core 48 and the mirror holder 30 are displaced toward the vehicle rear side, and the inner wall 32 and the peripheral wall 30A of the mirror holder 30 are moved away from the supporting surface 20A of the inner case 16 (the supporting wall 20) and the peripheral wall 14A of the case 14, respectively. Therefore, the frictional force (sliding resistance) between the supporting surface 20A and the contacting surface 32A of the inner wall 32, and the frictional force (sliding resistance) between the peripheral wall 14A inner peripheral surface of the case 14 and the peripheral wall 30A outer peripheral surface of the mirror holder 30, can be reduced more effectively (can be made to be zero).

Note that, in the above-described first embodiment and second embodiment, the present invention is structured so as to be applied to the vehicle door mirror devices 10, 60. However, the present invention may be structured so as to be applied to other mirror devices that are at the vehicle exterior or the vehicle interior.

The disclosure of Japanese Patent Application No. 2014-124523, that was filed on Jun. 17, 2014, is, in its entirety, incorporated by reference into the present specification.

EXPLANATION OF REFERENCE NUMERALS 10 vehicle door mirror device (vehicle mirror device)
14 case (contacting member)
16 inner case (contacting member)
22 motor (driving means)
30 mirror holder (moving member)
34 support pivot (contacting member)
36 solenoid (displacing means)
44 coil spring (contacting means)
50 mirror
50A mirror surface
60 vehicle door mirror device (vehicle mirror device)

The invention claimed is:

1. A vehicle mirror device comprising:
   a mirror that is provided at a vehicle;
   a moving member that, when moved, adjusts a mirror surface orientation of the mirror;
   a contacting member that contacts the moving member along two orthogonal directions; and
   a displacing portion that, when the moving member is moved, displaces one of the moving member and the contacting member in one of the two orthogonal directions such that the moving member and the contacting member move away from one another in the one direction but stay substantially in contact along the other of the directions.

2. The vehicle mirror device of claim 1, comprising a contacting portion that applies contact force to one of the moving member and the contacting member, wherein the moving member and the contacting member contact one another, and, when the moving member is moved, the displacing portion displaces one of the moving member and the contacting member against the contact force.

3. The vehicle mirror device of claim 1, further comprising a driving portion to which the displacing portion is electrically connected in parallel, such that when the driving portion is driven, the moving member is moved.

4. The vehicle mirror device of claim 2, further comprising a driving portion to which the displacing portion is electrically connected in parallel, such that when the driving portion is driven, the moving member is moved.

5. The vehicle mirror device of claim 1, wherein the moving member and the contacting member have mutually contacting surfaces that substantially maintain contact after the displacing portion displaces one of the moving member and the contacting member in one of the two orthogonal directions.

6. The vehicle mirror device of claim 1, wherein the moving member includes a mirror holder that holds the mirror, the contacting member includes a support pivot that is pivotally engaged to the mirror holder, and wherein the displacement caused by the displacing portion reduces frictional engagement in the pivotal engagement between the moving member and the support pivot.

7. The vehicle mirror device of claim 6, wherein both the support pivot and the mirror holder include a pivoting surface having a cylindrical portion, and wherein the displacement caused by the displacing portion moves the pivoting surfaces of the support pivot and the mirror holder away from one another except at the cylindrical portions of the pivoting surfaces.

* * * * *